US011860352B2

(12) United States Patent
Masumura

(10) Patent No.: US 11,860,352 B2
(45) Date of Patent: Jan. 2, 2024

(54) IMAGE OBSERVATION APPARATUS AND LIGHTING OPTICAL SYSTEM THEREOF

(71) Applicant: MACHINE VISION LIGHTING INC., Kokubunji (JP)

(72) Inventor: Shigeki Masumura, Kokubunji (JP)

(73) Assignee: MACHINE VISION LIGHTING INC., Tokyo (JP)

( * ) Notice: Subject to any disclaimer, the term of this patent is extended or adjusted under 35 U.S.C. 154(b) by 0 days.

(21) Appl. No.: 18/008,442

(22) PCT Filed: Nov. 15, 2021

(86) PCT No.: PCT/JP2021/041949
§ 371 (c)(1),
(2) Date: Dec. 5, 2022

(87) PCT Pub. No.: WO2022/107725
PCT Pub. Date: May 27, 2022

(65) Prior Publication Data
US 2023/0213748 A1 Jul. 6, 2023

(30) Foreign Application Priority Data
Nov. 17, 2020 (JP) ................................ 2020-191278

(51) Int. Cl.
G02B 21/18 (2006.01)
(52) U.S. Cl.
CPC .................... G02B 21/18 (2013.01)
(58) Field of Classification Search
CPC .......... G02B 21/02; G02B 21/18; G02B 9/00; G02B 25/00; G02B 15/00; G02B 15/1421;
(Continued)

(56) References Cited

U.S. PATENT DOCUMENTS

2008/0049314 A1* 2/2008 Steffen ............... G02B 21/0012
359/389
2012/0147460 A1* 6/2012 Kubler ................... G02B 21/22
359/389
(Continued)

FOREIGN PATENT DOCUMENTS

CN 107615049 A 1/2018
JP 05323198 A * 12/1993
(Continued)

OTHER PUBLICATIONS

Office Action dated Jan. 12, 2022, in Japanese Patent Application No. 2020-191278.
(Continued)

Primary Examiner — Mustak Choudhury
(74) Attorney, Agent, or Firm — Potomac Law Group, PLLC

(57) ABSTRACT

OBJECT
To make an object to be observed observable with high resolution and to make an inclination angle of a surface of the object to be observed recognizable over a wide range.
SOLUTION
An image observation system 100 provided with a lighting optical system 116 irradiating an object to be observed W with an illumination light and an observation optical system 122 collecting object light from the object to be observed W to guide to a detector 126, the image observation system 100 comprising an objective lens 122A opposed to the object to be observed W, a beam splitter 116B disposed on an opposite side to the object to be observed W with respect to the objective lens 122A, and a relay image RI of the illumination light splitting member 114 for dividing wavelength regions R, G and B of the illumination light into a plurality
(Continued)

of different solid angle regions IS1, IS2 and IS3, being disposed in front of the objective lens 122A.

9 Claims, 5 Drawing Sheets

(58) Field of Classification Search
CPC ............ G02B 15/144511; G02B 15/22; G02B 17/008; A61B 3/102; A61B 1/00186; A61B 1/00188; A61B 3/12; A61B 5/0068
See application file for complete search history.

(56) References Cited

U.S. PATENT DOCUMENTS

| | | | |
|---|---|---|---|
| 2014/0355003 A1* | 12/2014 | Masumura | G01B 11/30 356/600 |
| 2017/0067835 A1 | 3/2017 | Masumura | |
| 2018/0299386 A1 | 10/2018 | Masumura | |
| 2020/0150326 A1 | 5/2020 | Kano et al. | |
| 2020/0158657 A1 | 5/2020 | Masumura | |

FOREIGN PATENT DOCUMENTS

| | | | |
|---|---|---|---|
| JP | 2008-049168 | A | 3/2008 |
| JP | 2013-120099 | A | 6/2013 |
| JP | 5866573 | B1 | 2/2016 |
| JP | 5866586 | B1 | 2/2016 |
| JP | 2017-156694 | A | 9/2017 |
| JP | 6451821 | B1 | 1/2019 |
| JP | 2020-076717 | A | 5/2020 |
| KR | 10-2013-0021425 | A | 3/2013 |
| WO | WO 2019/245785 | A1 | 12/2019 |

OTHER PUBLICATIONS

Office Action dated May 12, 2022, in Japanese Patent Application No. 2020-191278.
Office Action dated Aug. 18, 2022, in Japanese Patent Application No. 2020-191278.
Decision to Grant dated Nov. 4, 2022, in Japanese Patent Application No. 2020-191278.
Office Action dated Jul. 4, 2023, in Korean Patent Application No. 10-2022-7040264.
Office Action issued Apr. 26, 2023, in Chinese Patent Application No. 202180034768.9.

* cited by examiner

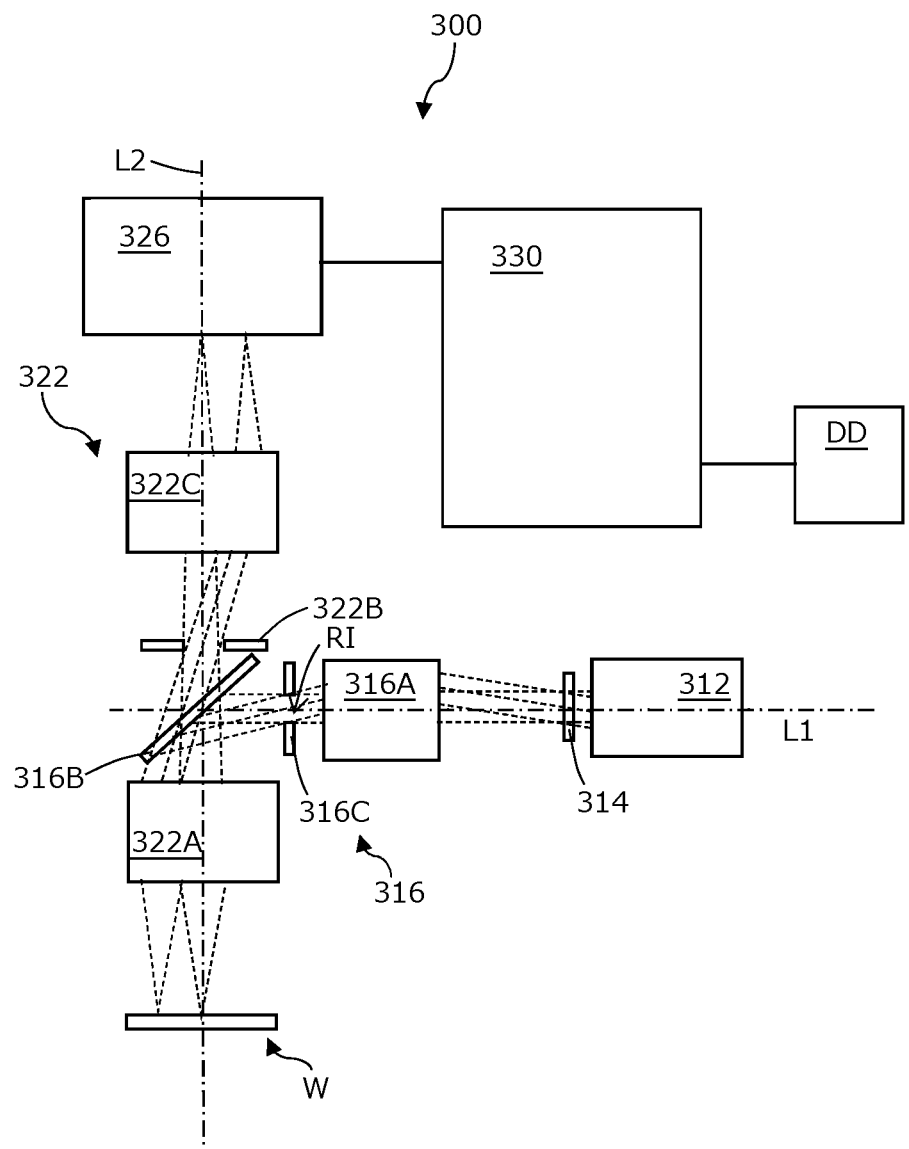

IMAGE OBSERVATION APPARATUS AND LIGHTING OPTICAL SYSTEM THEREOF

TECHNICAL FIELD

The present invention relates to an image observation apparatus and a lighting optical system thereof. In particular, the present invention relates to an image observation apparatus and a lighting optical system thereof, by which it is possible to observe an object to be observed with high resolution and to recognize an inclination angle of a surface of the object to be observed over a wide range.

BACKGROUND ART

Conventionally, there has been known an image observation apparatus provided with a lighting optical system for irradiating an object to be observed with an illumination light and an observation optical system for collecting an object light from the object to be observed and guiding it to a detector, as shown by Patent Documents 1 to 3. According to the Patent Documents 1 to 3, a lighting optical system equipped with one side telecentric optical system is used so that it is possible to obtain information on inclination angles of respective points on the object to be observed, based on one captured (picked up) image. In other words, according to this invention, it is possible to observe a minute uneven state of the object to be observed easily and speedily.

PRIOR ART REFERENCE

Patent Document

Patent Document 1: Japan Patent No. 5866573
Patent Document 2: Japan Patent No. 5866586
Patent Document 3: Japan Patent No. 6451821

SUMMARY OF THE INVENTION

Problem to be Solved by the Invention

The image observation apparatus according to the Patent Documents. 1 to 3, makes it possible to obtain with high accuracy information on inclination angles of respective points on the object to be observed on the basis of one captured image, but has taken a constitution that the optical path of the lighting optical system is interposed between an objective lens used in the observation optical system and the object to be observed.

In other words, according to the constitution of the Patent Document. 1, it is necessary to make a working distance between the objective lens and the object to be observed larger accordingly. For this reason, it is difficult to make numerical aperture of the objective lens larger, and as a result a range of detection of inclination angles at respective points of the object to be observed is small, so there is an undesirable possibility that it is difficult to observe the object to be observed with high resolution.

The present invention was made in order to solve the above described conventional problems, and has for its object to provide an image observation apparatus which makes an object to be observed observable with high resolution and makes an inclination angle of a surface of the object be observed to be recognizable over a wide range, and a lighting optical system of the image observation apparatus.

Means to Solve the Problems

The invention of claim 1 of the present application provides an image observation apparatus provided with a lighting optical system for irradiating an object to be observed with an illumination light and an image observation optical system collecting an object light from the object to be observed and guiding it to a detector, the image observation apparatus being further provided with an objective lens disposed opposed to said object to be observed and a beam splitter so disposed, on a side opposite to the object to be observed with respect to the objective lens, that the illumination optical axis of said lighting optical system and the observation optical axis of said observation optical system are in agreement with each other, wherein a filter member that divides optical attributes of said illumination light into one or more solid angle regions or a relayed image of the filter member is disposed before said objective lens, thereby said problems being solved.

The invention of claim 2 or 8 of the present application provides the image observation apparatus in which said filter member or the relayed image of the filter member is disposed at a position of an aperture stop that determines numerical aperture of said objective lens.

The invention of claim 3 or 9 of the present application provides the image observation apparatus in which said optical attributes of said filter member include wavelength regions of light.

The invention of claim 4 or 10 of the present application provides the image observation apparatus in which either of said lighting optical system and said observation optical system is a telecentric optical system on a side of the object to be observed.

The invention of claim 5 or 11 of the present application provides the image observation apparatus in which said relayed image is a reduced image of said filter member.

The invention of claim 6 of the present application provides the image observation apparatus in which said objective lens is configured to be interchangeable.

Meanwhile, the invention of claim 7 of the present application provides a lighting optical system to be used in an image observation apparatus which collects an object light from an object to be observed and makes the image of the object to be observed observable, the lighting optical system being provided with an objective lens opposed to said object to be observed, a beam splitter disposed, on an opposite side of the object to be observed with respect to the objective lens, so that the optical axis of an illumination light of said lighting optical system and the optical axis of an observation light of said observation optical system may be an agreement with each other, wherein a filter member that divides optical attributes of said illumination light into more than one solid angle regions or a relayed image of the filter member is disposed before said objective lens, thereby the problems being solved.

Advantageous Effects of the Invention

According to the present invention, it is possible to observe an object to be observed with high resolution and it is possible to recognize an inclination angle of a surface of the object to be observed in a wide range.

BRIEF DESCRIPTION OF THE DRAWINGS

FIG. 7 is a schematic view of an image observation apparatus according to a third embodiment of the present invention.

EMBODIMENTS FOR CARRYING OUT THE INVENTION

Hereinafter, the first embodiment of the present invention will be explained with reference to FIG. 1 to FIG. 5.

Meanwhile, the present invention is not limited to the contents described with respect to the embodiments described below. Further, the constitutional elements in the below described embodiments contain ones easily conceivable by those skillful among the art, ones which are substantially same, that is, ones which are equivalent. Furthermore, the constitutional elements disclosed in the embodiments described below may be combined properly or selected properly.

Figure 1:
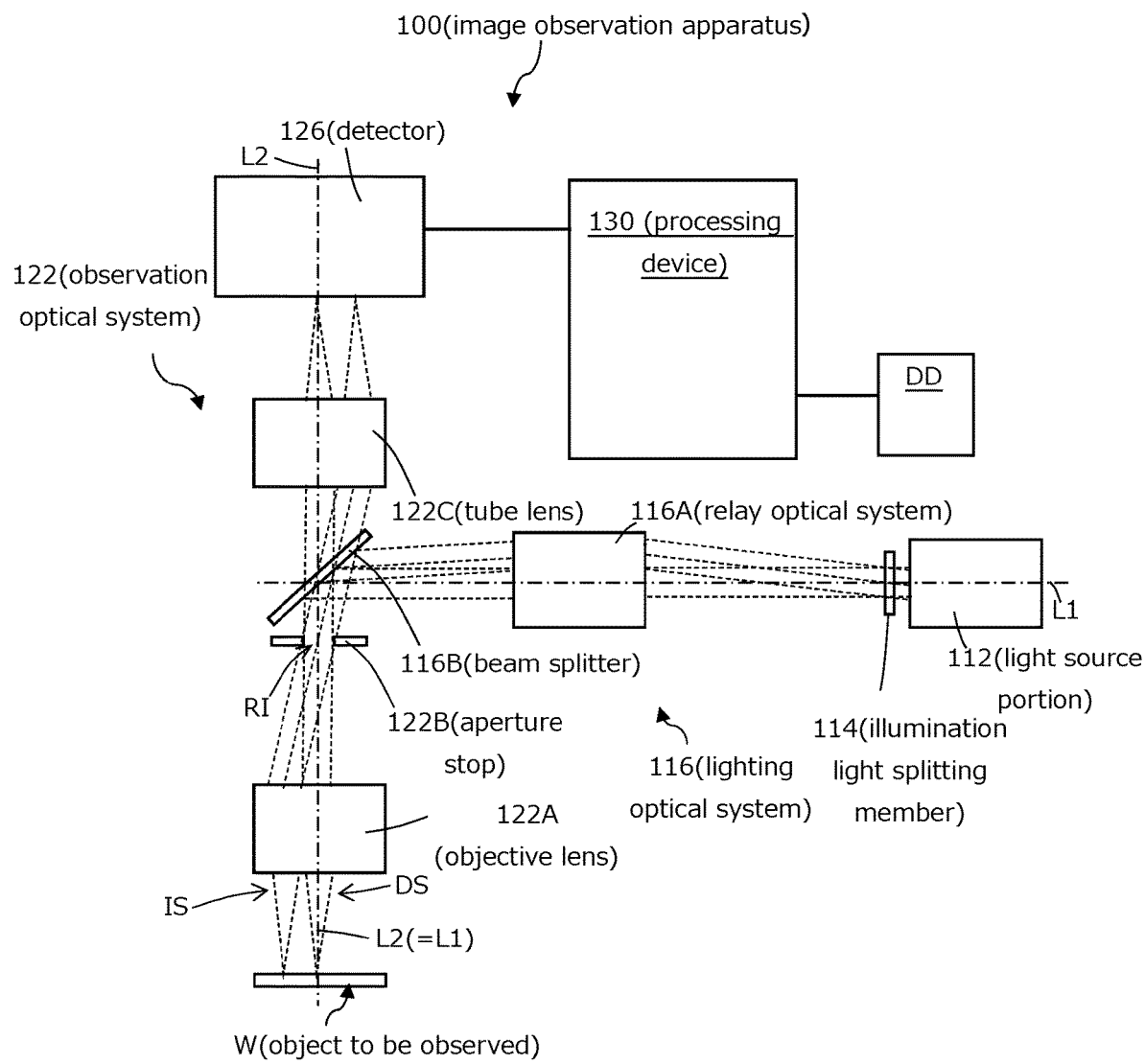
FIG. 1 is a schematic view showing an image observation apparatus according to a first embodiment of the present invention.
Figure 2:
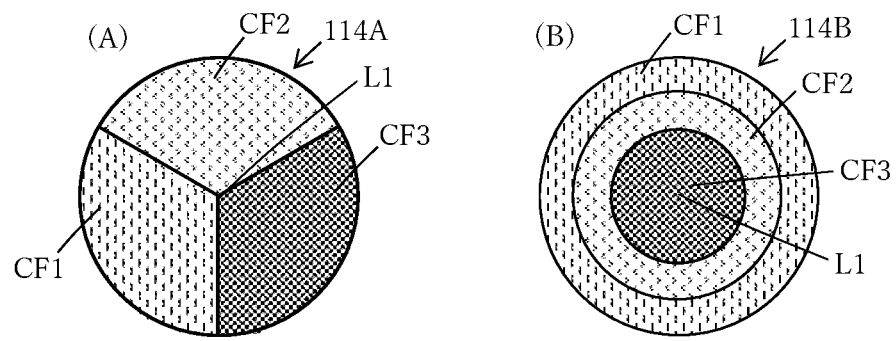
FIG. 2 is views each showing an illumination light splitting member used in a lighting optical system of FIG. 1.((A) is a view of the illumination light splitting member provided with three filter regions about the center, and (B) is a view of the illumination light splitting member provided with three concentric circular filter regions).
Figure 3:
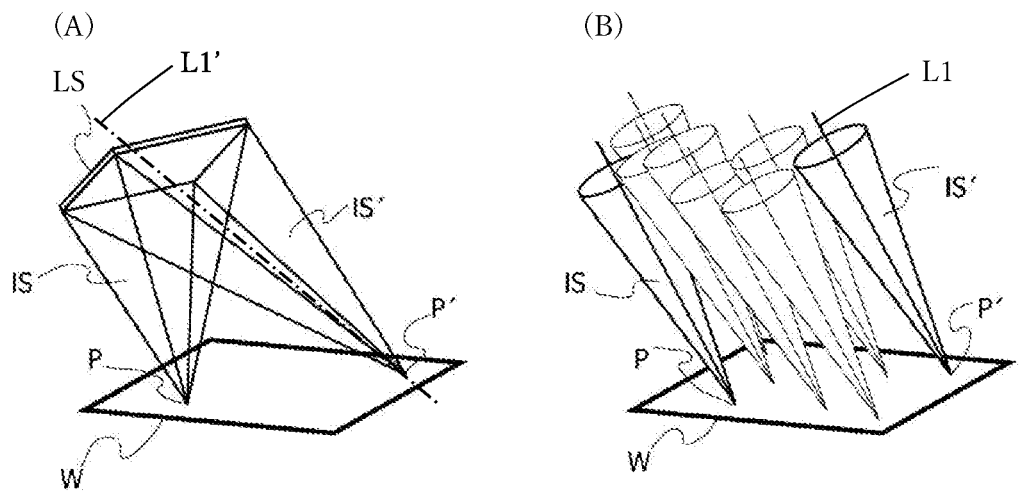
FIG. 3 is comparative schematic views of irradiation solid angles of the illumination light ((A) is a schematic view of a case where irradiation solid angles of the illumination light are similar to each other, and (B) is a schematic view of irradiation solid angles of the illumination light when a telecentric optical system is provided on a side of the object to be observed, of the objective lens).
Figure 4:
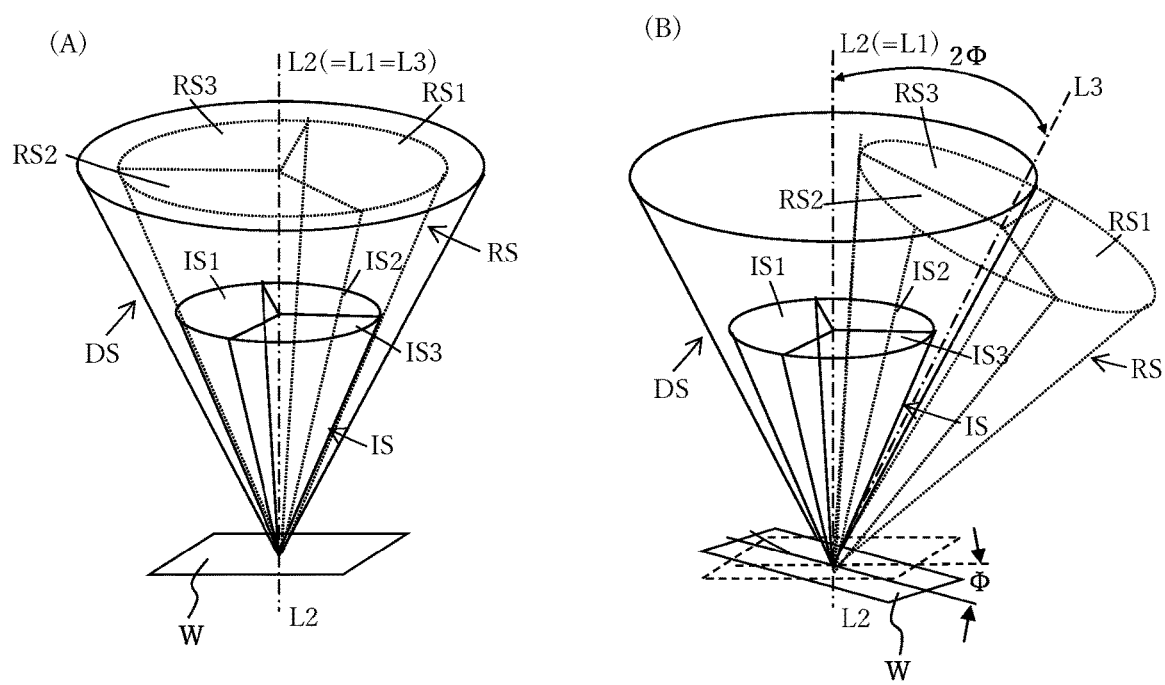
FIG. 4 is schematic views showing relationship among irradiation solid angles, reflection solid angles and observation solid angles in the image observation apparatus of FIG. 1 ((A) is a view of a case where normal vector of the surface of the object to be observed coincides with the observation optical axis, and (B) is a view of a case where the surface of the object to be observed has an inclination angle φ, and the normal vector is displaced from the observation optical axis).

The image observation apparatus 100 comprises, as shown in FIG. 1, a light source portion 112, an illumination light splitting member (filter member) 114, a lighting optical system 116, an observation optical system 122, a detector 126, a processing device 130 and a display device DD. Meanwhile, in the present embodiment, it is preferable that the object to be observed W has a near glossy surface even if the surface shape is complicated, though not limited thereto.

Herein below, respective elements will be described in detail.

The light source portion 112 may be one composed of an arrangement of one or more chip-type LEDs, organic ELs, or light guiding plate from a sidelight. Position of the light source portion 112 may be changeable along the illumination optical axis L1.

The illumination light splitting member 114, as shown in FIG. 1, divides light wavelength regions (optical attributes) Red, Green and Blue (where Red stands for a red wavelength region, Green stands for a green wavelength region, and Blue stands for a blue wavelength region) of the illumination light, into a plurality of different solid angle regions (for example, references IS1, IS2 and IS3 in FIG. 4(A)) (hereinafter, references Red, Green and Blue are respectively denoted by references R, G and B, also). For example, the illumination light splitting member 114 (114A, 114B) is, as shown in FIGS. 2(A) and 2(B), disc-shaped and comprises a plurality of filter regions (color filters). These light splitting members 114 are changeable appropriately. For example, the illumination light splitting member 114A shown in FIG. 2(A) comprises three same-shaped (fan-shaped of a central angle 120°) filter regions CF1, CF2 and CF3. The illumination light splitting member 114B shown in FIG. 2(B) comprises three concentric circular filter regions CF1, CF2 and CF3.

The illumination light splitting member 114 is disposed to be imaged on the position of an aperture stop 122B described later, between the light source portion 112 and the relay optical system (for example, lenses arranged in tandem) 116A of the illumination optical system 116 on the illumination optical axis L1 (an image of the illumination light splitting member 114 formed in the position of the aperture stop 122B, is called as a relay image RI.). The relay image RI is a reduced image of the illumination light splitting member 114. Meanwhile, the position also of the illumination light splitting member 114 may be changeable along the illumination optical axis L1 (In other words, this is a constitution that the relay image RI of the illumination light splitting member 114 is able to be disposed in the position of the aperture stop 122B.). Meanwhile, in the present embodiment, the illumination light splitting member 114 is provided at the outer periphery of the above described filter regions with an illumination stop portion (not shown) that is a light shielding mask for shielding the illumination light, but the illumination stop portion may not be limited to such a structure, and a separate member may be provided as an illumination stop member. Or, a liquid crystal shutter whose transmittance or color is electrically changeable may be used for the illumination light splitting member. Also, the illumination light splitting member that is transmission type, may be reflection type.

The lighting optical system 116 is so configured to irradiate the object to be observed W with the illumination light from the light source portion 112, as shown in FIG. 1. In other words, the lighting optical system 116 has a constitution used in the image observation apparatus 100 which collects an object light from the object to be observed W and makes an image of the object to be observed W observable. The lighting optical system 116 which, on a side of the object to be observed, is configured to form a telecentric optical system, comprises the relay optical system 116A, a beam splitter 116B, the aperture stop 122B, and an objective lens 122A (the above described illumination light splitter member 114 may be included).

The relay optical system 116A is, for example, a refractive type lens system through which illumination light passing through the illumination light splitting member 114 passes, and may be a single lens or be composed of a plurality of lenses. The lens or lenses include concavo-convex shaped one(s) or refractive index profile type lens(es). The relay optical system 116A may be a telecentric optical system on the relay image side. The reason therefor will be described later.

The beam splitter 116B, as shown in FIG. 1, is disposed on an opposite side to the object to be observed with respect to the objective lens 122A, and the illumination optical axis L1 of the lighting optical system 116 and the observation optical axis L2 of the observation optical system 122 are in agreement with each other. In other words, the beam splitter 116B is disposed between a tube lens 122C and the objective lens 122A on the observation optical axis L2 of the observation optical system 122, and makes the illumination optical axis L1 of the illumination light passing through the illumination splitting member 114 coincident with the observation optical axis L2. In other words, the present embodiment is the image observation apparatus 100 provided with so called coaxial episcopic-illumination.

The aperture stop 122B is an optical element that determines a numerical aperture of the objective lens 122A and the objective lens 122A is, on the side of the object to be observed, a telecentric optical system. Therefore, the aperture stop 122B is disposed at the focusing position of the objective lens 122A on the opposite side to the object to be observed (For this arrangement, in case where light is emitted from the respective points on the plane of the aperture stop 122B, that light is made substantially parallel and is irradiated onto the object to be observed W). In order to adjust brightness of the image on the detector 126, to adjust resolution described later, and to adjust observation ability of inclination angle of the surface of the object to be observed W, inner diameter of the aperture stop 122B may be adjustable.

The objective lens 122A has been infinity-corrected, as shown in FIG. 1, and is opposed to the object to be observed W. The objective lens 122A irradiates the object to be observed W with a specific illumination solid angle IS with the illumination light emitted from the light source portion 112 and passing through the illumination light splitting member 114 and the relay optical system 116A. At this time, since the objective lens 122A has been infinity-corrected and the relay optical system 116A is, on the relay image side, telecentric optical system, so light rays parallel to each other in illumination light passing through the aperture stop 122B (for instance, principal rays at respective image heights (respective image forming positions) of the relay optical system 116A), are all collected at the same position on the object to be observed W after passing through the objective lens 122A. Thus, uniform illumination may be realized at respective points on the object to be observed W observed through the objective lens 122A (Koehler illumination). Incidentally, the infinity-corrected objective lens 122A is preferable for securing properties of the beam splitter 116B, but this is not always indispensable for the present embodiment. In a case where an objective 122A that is not infinity-corrected is used, it is not necessary either that the relay lens system 116A is a telecentric system on the relay image side. For example, in a case where axial marginal rays (the outermost rays among rays advancing in the direction of the observation optical axis L2 (the illumination optical axis L1) of the objective lens 122A and collecting on the focusing point) are inclined with respect to the observation optical axis L2 (the illumination optical axis L1), the relay optical system 116A may be so constituted that the relay image RI is formed with an inclination angle of the principal rays equivalent in magnitude to the inclination angle of the axial marginal light rays of the objective lens 122A.

Further, the objective lens 122A as a part of the observation optical system 122 receives the object light (the illumination light reflected by the object to be observed W) from the object to be observed W with a predetermined solid angle DS (In other words, the objective lens 122A is disposed on the optical path of the illumination optical system 116 (or on the illumination optical axis L1) and on the optical path of the observation optical system 122 (on the observation optical path L2). The objective lens 122A is replaceable, so the observation range (that is, magnification) of the object to be observed W or numerical aperture can be changed. That is to say, proper exchange of the objective lens 122A enables to select optimum inclination angle with optimum resolution in accordance with the object to be observed W. Meanwhile, when the objective lens 122A is exchanged, the aperture stop 122B may be exchanged together with the objective lens 122A. For this, it is desirable that the aperture stop 122B is held at the same position. A revolving mechanism, for example, may be adopted for replacing the objective lens 122A. Thus, the relay image RI of the illumination light splitting member 114 is disposed on the position of the aperture stop 122B of the objective lens 122A. For this, the lighting optical system 116 can irradiate the respective positions of the observation range of the object to be observed W, with the illumination light having solid angle shapes substantially similar to each other about the illumination principal rays L1' as the center, and separated into solid angle regions IS1, IS2 and IS3 of respective wavelength regions R, G and B. At this time, through the illumination aperture LS by the objective lens 122A, the illumination solid angles IS and IS' with respect to the different positions P and P' of the object to be observed W, are as shown in FIG. 3(A). However, the illumination solid angles IS and IS' differ from each other in shape or direction of the illumination principal rays L1' at the positions P and P', as shown in FIG. 3(A).

On the contrary, if the objective lens 122A is a telecentric optical system on the side of the object to be observed, it is possible to irradiate, with the illumination light, all the positions in the observation range of the object to be observed W under substantially the same conditions. In other words, at this time, the illumination solid angles IS are the same at the respective points of the object to be observed W. Meanwhile, since many of the object to be observed W are plane, the objective lens 122A that forms the telecentric optical system on the side of the object to be observed, may be so constituted to cause similar reflections to each other at points which are different in position but the same in inclination angle ϕ, on the entire observation range. This is convenient. Meanwhile, for the purpose of correcting errors in the lighting optical system 116 or the observation optical system 122 caused by assembling errors and the like, as well as positional deviation of the aperture stop 122B caused in a case where the aperture stop 122B is exchanged together with the objective lens 122A, movements of the light source portion 112, the illumination light splitter 114 and the relay optical system 116A may be adjusted.

The observation optical system 122, as shown in FIG. 1, receives light reflected by the object to be observed W, thereby collecting the object light from the object to be observed W with predetermined observation solid angle DS and guiding the same to the detector 126. That is to say, the observation optical system 122 collects the object light and makes the image of the object to be observed W observable. The observation optical system 122 is a telecentric optical system on the side of the object to be observed W and comprises the objective lens 122A, the aperture stop 122B and the tube lens 122C. The tube lens 122C forms an image of the object light passing through the objective lens 122A and the aperture stop 122B. Meanwhile, regarding the objective lens 122A and the aperture stop 122B already explained herein before, explanation is omitted now.

The detector 126 can discriminate between different wave length regions R, G and B in the light of the image of the object to be observed W formed through the observation optical system 122. The detector 126 is, for example, a color CCD camera or a color CMOS camera, and outputs the formed image of the object to be observed W as two dimensional color image data. In the present embodiment, different optical attributes are different wave length regions R, G and B of the light. Respective pixels of the detector 126 may be composed of a set of pixels respectively attached with color filters of red, green and blue colors (Bayer pattern elements each composed of 4 pixel units). The detector 126 may be a stacked type detector, as disclosed in U.S. Pat. No. 5,965,875, in which detection layers of respective colors (wave length regions) are stacked in the direction of the optical axis. Incidentally, the color image data are processed in a processing device 130.

As shown in FIG. 1, the processing device 130 is connected to the detector 126 and the display device DD. For this, the processing device 130 can process the image data outputted from the detector 126 to perform interpolation of pixels for the object to be observed W and remove noise (In addition, the processing device 130 may conduct dimensional measurement of or measure an inclination angle $\phi$ of the object to be observed W, and may highlight a region having a particular inclination angle $\phi$). The display device DD can display the color image data and three dimensional image picked up by the detector 126 and various information, on the basis of the outputs from the processing device 130. The present embodiment is equipped with the processing device 130, but instead the display device DD may be connected directly to the detector 126 with no processing device.

Next, with reference to FIGS. 4(A) and (B), there will be explained the principle why inclination angle $\phi$ of the surface of the object to be observed W may be able to be observed, based on differences in respective outputs of wave length regions R, G and B of the light from the detector 126. Incidentally, what are depicted by solid lines are the illumination solid angle IS by the lighting optical system 116 and the observation solid angle DS by the observation optical system 122 (for convenience sake, the illumination solid angle IS and the observation solid angle DS are shown differently in size so as to be discriminative clearly from each other, but there is no such difference in size in the present embodiment). In the present embodiment, the objective lens 122A and the aperture stop 122B are disposed in the optical path of the lighting optical system 116 and the optical path of the observation optical system 122. Here, it is so constituted that the aperture stop 122B is located at the focusing position of objective lens 122A on the opposite side to the object to be observed W, and the relay image RI of the illumination light splitting member 114 as the filter member is formed at the position of the aperture stop 122B. For this constitution, in a case where the relay image RI is larger than the size of the aperture stop 122B, the outermost shape of the illumination solid angle IS is determined by the aperture stop 122B, and there are no change in the shape and the direction of the illumination solid angle IS.

Assuming this case, the following explanation is made. Meanwhile, what are depicted by lines is the reflection solid angle RS formed by the object light. The reflection solid angle RS is formed by reflection light (object light) of the illumination light irradiated onto the respective points of the object to be observed W. The illumination light is regularly reflected at the respective points and becomes the object light, so the shape of the reflection solid angle RS is the identical with the mirror-reflected shape of the illumination solid angle IS. That is to say, the solid angle regions IS1, IS2 and IS3 of the illumination solid angle IS correspond, respectively, to the solid angle regions RS1, RS2 and RS3 of the reflection solid angle RS (At the same time, there are relations of IS1=RS1, IS2=RS2, and IS3=RS3).

At first, in a case where the object to be observed W is not inclined, as shown in FIG. 4(A), the reflection light from the object to be observed W is not inclined with respect thereto, and the reflection optical axis L3 and the observation optical axis L2 are coincident with each other. In other words, if the illumination light having the illumination solid angle IS is irradiated onto the object to be observed W, the direction of the reflection solid angle RS and the direction of the observation solid angle DS are coincident with each other, so that respective wave length regions R, G and B corresponding to the solid angle regions RS1, RS2 and RS3 of the observation solid angle RS, are detected by the detector 126 to be equal. Thus, the ratios of the light amounts of the respective wave length regions R, G and B are equal to each other, so the color observed is white, thereby it being judged that the inclination angle $\phi$ is zero.

On the other hand, in a case where the object to be observed W is inclined (inclination angle $\phi \neq 0$), the reflection light from the object to be observed W, is inclined (inclination angle $2\phi$)), as shown in FIG. 4(B), and the reflection optical axis L3 and the observation optical axis L2 are not coincident. In other words, if the illumination light having the illumination solid angle IS is irradiated onto the object to be observed W, the shape of the reflection solid angle RS is held as shown in FIG. 4(A), but the direction of the reflection solid angle RS becomes inclined with respect to the direction of the observation solid angle DS (inclination angle $2\phi$), so that the observation solid angle DS takes a state in which it does not include a portion of the reflection solid angle RS. Thus, the detector 126 can not almost receive light of wave length region corresponding to the solid angle region RS1 of the reflection solid angle RS caused by the object light, in the range of the observation solid angle DS. On the other hand, the detector 126 can receive light of wave length regions corresponding to the solid angle regions RS2 and RS3, substantially equally. Thus, the color observed changes based on the ratios of the light amounts of the respective detected wave length regions R, G and B, thereby it being possible to judge quantitatively the inclination angle $\phi$.

As described, according to the present embodiment, due to the partially sharing or inclusive relationship of the observation solid angle DS with the reflection solid angle RS having mirror-reflected shape of the illumination solid angle IS, the inclination $\phi$ of the surface of the object to be observed W may be observed.

Accordingly, in the present embodiment, relative relationship of the observation solid angle DS with the reflection solid angle RS is held constant at the respective points on the object to be observed W, depending on the position, with respect to the objective lens 122A, on which position the relay image RI of illumination light splitting member 114 that is the filter member, is formed, and depending on the position of the aperture stop 122B with respect to the objective lens 122A. Then, when the reflection solid angle RS is inclined by twice ($2\phi$) as large as the inclination (inclination angle $\phi$) of the object to be observed W, the relative relationship held constant changes, thereby causing change in brightness of the reflection light captured at the observation solid angle DS, or changes in brightness of the reflection light for respective different optical attributes, so that with respect to the inclination of the object to be observed W, it is possible to detect the direction and the inclination angle $\phi$ thereof quantitatively.

This is because, even if the image forming position of the relay image RI of the illumination light splitting member 114 and the position of the aperture stop 122B of the objective lens 122A change, there is no change in the reflection optical axis L3 of the reflection solid angle RS in the central illumination optical axis L1 (observation optical axis L2), but in case where there are such positional changes, inclination of the observation solid angle DS relative to the reflection solid angle RS changes largely in a point far from the illumination optical axis L1 (observation optical axis L2) within a determine field of view.

Figure 5:
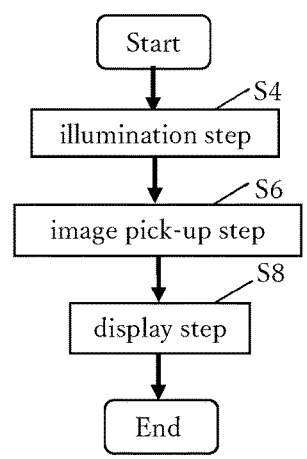
FIG. 5 is a flow chart of a procedure for making the shape of the object to be observed observable through the image observation apparatus shown in FIG. 1.

Next, observation procedure of the object to be observed W in the image observation apparatus 100 will be explained with reference to FIG. 5.

At first, illumination step (step 4 in FIG. 5) is performed. In the illumination step, illumination light having a particular illumination solid angle IS with a plurality of solid angle regions IS1, IS2 and IS3 having different light wavelength regions R, G and B, is irradiated onto the object to be observed W by the lighting optical system 116. Meanwhile, in the present embodiment, the illumination system 116 is used so that the illumination solid angles IS are made to be the same for the respective points of the object to be observed W.

Next, image pick-up step (step S6 in FIG. 5) is conducted. In the image pick-up step, the detector 126 receives the object light from the object to be observed W generated by the illumination light, with a predetermined observation solid angle DS and picks up an image.

Next, display step (step S8 in FIG. 5) is conducted. In the display step, the display device DD displays the object to be observed W observably, based on the image data outputted from the detector 126.

Thus, in the present embodiment, the beam splitter 116B is disposed between the objective lens 122A and the tube lens 122C, and the objective lens 122A is used in common in the illumination optical system 116 and the observation optical system 122. For this arrangement, in comparison with the case where the beam splitter is disposed between the object to be observed W and the objective lens, even the objective lens 122A having a smaller working distance to the object to be observed W may be adopted. For this reason, the numerical aperture of the observation optical system 122 can be made large easily, so it is possible to improve resolution of the observation optical system 122. At the same time, it is possible to make the size of the observation solid angle DS shown in FIGS. 4(A) and (B) to be substantially the same as the size of the illumination solid angle IS. Accordingly, as shown in FIG. 4(B), even the inclination angle ϕ becomes large to a certain extent, the detector 126 can detect the wavelength regions R, G and B of the plurality of solid angle regions RS1, RS2 and RS3 forming the reflection solid angle RS properly.

Further, the present embodiment is so constituted that the illumination light is made incident on the objective lens 122A through the relay optical system 116A, thereby it being possible to make the degree of freedom of the arrangement of the illumination light splitting member 114 and the light source portion 112 larger. In other words, it is possible to secure large degree of freedom with respect to setting of the object to be observed W. Further, since the image observation apparatus 100 has a constitution of a so called coaxial episcopic illumination microscope, recovery efficiency of the reflection light from the planer object to be observed W is superb, and in many cases it is possible to conduct bright observation over the object to be observed W in the entirety thereof.

Further, in the present embodiment, the optical attributes of the illumination light splitting member 114 are light wavelength regions R, G and B. Therefore, the illumination light splitting member 114 may be a general purpose color filter, and the detector 126 may be a general purpose color CCD camera or color CMOS camera as it is. Therefore, costs for the light splitting member 114 and the detector 126 may be made low, and the image observation apparatus 100 may be simple in constitution. Moreover, the optical attributes may be discriminated visually, and state of the inclination angle ϕ may be recognized easily.

Incidentally, in the present embodiment, three light wavelength regions R, G and B are not limited to red, green and blue of primary colors, but different light wavelength regions may be combined, or yellow, cyan as well as magenta which are in complementary color relationship, may be used.

Further, for the light wavelength regions, infrared or ultraviolet regions which are invisible, may be used, or two or more light wavelength regions differing from each other may be used. Incidentally, optical attributes except a plurality of different light wavelength regions R, G and B, may be polarizing light states differing from each other. In this case, for example, a polarizing plate for changing polarization state of light is used for the illumination light splitting member. For the detector 126, a corresponding polarizing plate may be used in order to discriminate optical attributes.

Further, in the present embodiment, either of the illumination optical system 116 and the observation optical system 122 is a telecentric optical system on the side of the object to be observed W. In other words, the illumination solid angles IS are the same for the respective points of the object to be observed W. Accordingly, in case where the object to be observed W is planer, uniform information for the image data can be obtained from all the respective points on the surface of the object to be observed W. Thus, it is possible to observe and evaluate information on the surface of the object to be observed W uniformly with no relation to the locations of the respective points thereon. At the same time therewith, even if there is large difference in heights of the respective points on the surface of the object to be observed W, it is possible to perform focusing easily and observe the surface shape with high resolution. Meanwhile, not only the above, but also either the illumination optical system or the observation optical system may be one side telecentric optical system, or either of them may not be one side telecentric optical system. Of course, either one or either of them may adopt both side telecentric optical system.

Meanwhile, the respective filter regions CF1, CF2 and CF3 of the illumination light splitting member 114 are formed generally by a photolithographic technique or the like. In the case of the illumination light splitting member 114A as shown in FIG. 2(A), in order to reduce observation error of inclination angle ϕ of the object to be observed W, it is necessary that the boundaries of the respective filter regions CF1, CF2 and CF3 are made coincident with each other with high precision. Similarly, in the case of the illumination light splitting member 114B as shown in FIG. 2(B), it is necessary that the center positions of the respective filter regions CF1, CF2 and CF3 are made coincident with each other with high precision.

On the contrary, in the present embodiment, the relay image RI is a reduced image of the illumination light splitting member 114. Therefore, even if precision with respect to illumination light splitting member 114 is loosened to the extent of the reduction ratio, it is possible to maintain high observation precision for the inclination angle ϕ. In other words, according to the present embodiment, reduction of precision caused by errors upon machining or assembling the illumination light splitting member 114, can be prevented. Meanwhile, not only the above, but also the relay image RI may be a life-sized image or an enlarged one. In case of the life-sized image, a lens constitution may be simple, that is effective for cost reduction. In case of the enlarged image, the lighting optical system 116 may be made compact.

Further, in the present embodiment, the objective lens 122A is exchangeable. In other words, in the present embodiment, the objective lens 122A is used commonly in the lighting optical system 116 and the observation optical system 122, so if the objective lens 122A is exchanged in accordance with the object to be observed W, the illumination solid angle IS and the observation solid angle DS can be switched over at the same time. In other words, exchanging the objective lens 122A enables the range of the observable inclination angle φ to switch over easily. Meanwhile, instead thereof, the objective lens 122A may be fixed. In this case, the aperture stop 122B may be so configured that diameter thereof is made variable to switch over the range of the observable inclination angle φ.

As described, according to the present embodiment, the object to be observed W is observable with high resolution, and a wide range of the inclination angle φ may be recognized.

Meanwhile, if an objective lens having a large diameter and a large working distance is selected, it is possible to make the numerical aperture of the observation optical system large even in the case where the beam splitter is disposed between the object to be observed W and the objective lens. However, in this case, it is inevitable to make the numerical aperture of the objective lens large and to increase the number of lenses for making correction of color aberrations caused thereby. In particular, in case where a color filter is used as the illumination light splitting member 114, to split into the illumination solid angles IS and IS' according the light wavelength regions, it is desirable for the objective lens to be corrected well with respect to color aberrations in order to prevent deterioration in resolution and detection error caused by color shifting. However, color aberrations become large in proportion to the maximum height of the light rays incident onto the lens or to the square thereof. Accordingly, the larger the numerical aperture is and the larger the working distance is, the more it is difficult to remove the color aberrations, and the more it is difficult to achieve both of making the lens compact and making the diameter and working distance thereof large. That is to say, according to the present embodiment, in comparison with the case where the beam splitter is disposed between the object to be observed W and the objective lens, it is possible to manufacture compact and low-cost image observation system 100.

Figure 6:
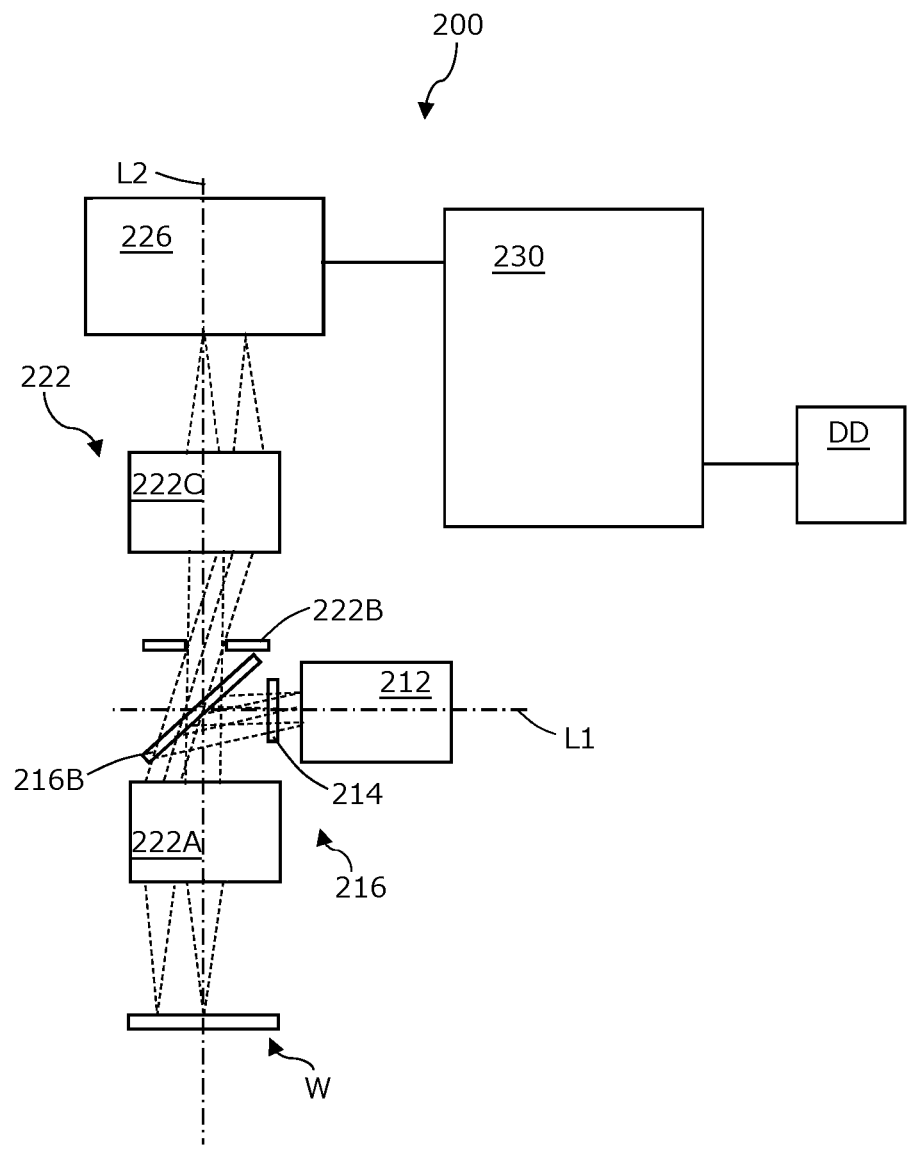
FIG. 6 is a schematic view of an image observation apparatus according to a second embodiment of the present invention.

Meanwhile, in the present embodiment, the lighting optical system 116 is equipped with the relay optical system 116A, but the present invention is not limited thereto. For example, the present invention may adopt a constitution of the second embodiment shown in FIG. 6. In the second embodiment, differing from the first embodiment, it is possible to dispose an illumination light splitting member 214 in the position of the aperture stop (illumination stop) on the illumination optical axis L1. Therefore, regarding the elements except portions related to the illumination light splitting member 214, abeam splitter 216B and an aperture stop 222B, the first digits of the reference numerals are changed and the explanations thereof are omitted.

In the present embodiment, since it is possible to dispose the illumination light splitting member 214 in the position of the aperture stop (illumination stop) on the illumination optical axis L1, the beam splitter 216B is disposed between the aperture stop 222B and the objective lens 222A used in the observation optical system 222. That is to say, according to the present embodiment, since there is no relay optical system, a constitution of the image observation apparatus 200 may be made more simple and compact, so it is possible to achieve low cost. Meanwhile, distance from the objective lens 222A to the illumination light splitting member 214 is made substantially equal to distance from the objective lens 222A to the aperture stop 222B. Meanwhile, no aperture stop 222B is used in the illumination optical system 216, so the illumination solid angle IS and the observation solid angle DS may be made different from each other in shape (this is the same in the third embodiment).

Or, the third embodiment shown in FIG. 7 may be adopted. In the third embodiment, like the second embodiment, the beam splitter 316B is disposed between the aperture stop 322B and the objective lens 322A used in the observation optical system 322. However, differing from the second embodiment, the lighting optical system 316 is provided with the illumination stop 316C. And, like the first embodiment, the lighting optical system 316 is provided with a relay optical system 316A. Accordingly, according to the present embodiment, the degree of freedom for arranging the lighting optical system 316 may be secured more largely, and it is possible to arrange the observation optical system 322 more appropriately. Meanwhile, regarding the elements except the relay optical system 316A, the aperture stop 322B and the illumination stop 316C, the first digits of the reference numerals are changed and the explanations thereof are omitted. Meanwhile, in the present embodiment also, it is not necessary that the objective lens 322A is infinity-corrected, and no telecentric system is required on the relay image side of the relay optical system 316A. Further, no illumination stop 316C may be required. Meanwhile, distance from the objective lens 322A to the illumination stop 316C is made substantially equal to distance from the objective lens 322A to the aperture stop 322B (In other words, the present embodiment also is so constituted that the relay image RI by the relay optical system 316A is formed at the position of the aperture stop 322B).

Meanwhile, in either of the above embodiments, explanation is made on the assumption that the illumination light splitting member having always determined properties was used, but an exchangeable or rotation-adjustable one may be adopted.

Also, in the above embodiments, the illumination light splitting member or the relay image RI of the illumination light splitting member may be disposed at the position of the aperture stop that determines the numerical aperture of the objective lens, but the present invention is not limited to such arrangements. The illumination light splitting member or the relay image RI of the illumination light splitting member may be disposed on an opposite side to the object to be observed W with respect to the objective lens (between the objective lens and the light source portion), that is, in front of the objective lens. Even in such case, the afore described partially shearing or inclusive relationship of the reflection solid angle RS with the observation solid angle DS may be obtained, so the advantageous effects of the present invention may be attained suitably.

Also, in the above embodiments, the illumination light splitting member as the filter member is so configured to divide the optical attributes of the illumination light into a plurality of different solid angle regions, but the present invention is not limited thereto. For example, the filter member may be so configured to change optical attributes of the illumination light to a specific optical attribute.

INDUSTRIAL APPLICABILITY

The present invention can be widely applicable to the image observation apparatus that is equipped with the lighting optical system irradiating the object to be observed with the illumination light and the observation optical system collecting the object light from the object to be observed to guide the detector.

LIST OF REFERENCE NUMERALS 100, 200, 300—image observation apparatus
112, 212, 312—light source portion
114, 114A, 114B, 214, 314—illumination light splitting member
116, 216, 316—lighting optical system
116A, 316A—relay optical system
116B, 216B, 316B—beam splitter
122, 222, 322—observation optical system
122A, 222A, 322A—objective lens
122B, 222B, 322B—aperture stop
122C, 222C, 322C—tube lens
126, 226, 326 detector
130, 230, 330—processing device
316C—illumination stop
B, G, R—light wavelength region
CF1, CF2, CF3—filter region
DD—display device
DS—observation solid angle
IS, IS'—illumination solid angle
IS1, IS2, IS3, RS1, RS2, RS3—solid angle region
L1—illumination optical axis
L1'—illumination principal ray
L2—observation optical axis
L3—reflection optical axis
LS—illumination aperture
P, P1, P2, P'—position
RI—relay image
RS—reflection solid angle
W object to be observed
φ—inclination angle

The invention claimed is:

1. An image observation apparatus provided with a lighting optical system for irradiating an object to be observed with an illumination light and an observation optical system for collecting object light from the object to be observed and guiding it to a detector, wherein the apparatus comprises: a filter member for dividing optical attribute of the illumination light into one or more solid angle regions; an objective lens opposed to the object to be observed; a beam splitter disposed on an opposite side to the object to be observed with respect to the objective lens and in which an illumination optical axis of the lighting optical system and an observation optical axis of the observation optical system are made coincide with each other; the filter member or a relay image of the filter member being disposed on the opposite side to the object to be observed with respect to the objective lens and near a focusing position of the objective lens on the illumination optical axis, thereby at respective points of the object to be observed, same illumination solid angles being formed; and wherein said filter member or the relay image of the filter member is disposed at a position of an aperture stop that determines a numerical aperture of said objective lens.

2. The image observation apparatus according to claim 1, wherein in said filter member said optical attribute is a light wavelength region.

3. The image observation apparatus according to claim 1, wherein either of said lighting optical system and said observation optical system is a telecentric optical system on the side of the object to be observed.

4. The image observation apparatus according to claim 1, wherein said relay image is a reduced image of said filter member.

5. The image observation apparatus according to claim 1, wherein said objective lens is interchangeable.

6. A lighting optical system to be used in an image observation apparatus which collects an object light from an object to be observed and makes an image of the object to be observed observable, wherein the lighting optical system comprises: a filter member for dividing optical attribute of the illumination light into one or more solid angle regions; an objective lens opposed to the object to be observed; a beam splitter disposed on an opposite side to the object to be observed with respect to the objective lens and in which an illumination optical axis of the lighting optical system and an observation optical axis of the observation optical system are in agreement with each other; the filter member or a relay image of the filter member being disposed on the opposite side to the object to be observed with respect to the objective lens and near a focusing position of the objective lens on the illumination optical axis, thereby at respective points of the object to be observed, same illumination solid angles being formed; and wherein said filter member or the relay image of the filter member is disposed at a position of an aperture stop that determines a numerical aperture of said objective lens.

7. The lighting optical system according to claim 6, wherein
in said filter member said optical attribute is a light wavelength region.

8. The lighting optical system according to claim 6, wherein
either of said lighting optical system and said observation optical system is a telecentric optical system on the side of the object to be observed.

9. The lighting optical system according to claim 6, wherein
said relay image is a reduced image of said filter member.

* * * * *